United States Patent
Sharma

(10) Patent No.: US 10,565,064 B2
(45) Date of Patent: Feb. 18, 2020

(54) EFFECTIVE DATA CHANGE BASED RULE TO ENABLE BACKUP FOR SPECIFIC VMWARE VIRTUAL MACHINE

(71) Applicant: EMC IP Holding Company LLC, Hopkinton, MA (US)

(72) Inventor: Anupam Sharma, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 15/886,720

(22) Filed: Feb. 1, 2018

(65) Prior Publication Data
US 2019/0235967 A1 Aug. 1, 2019

(51) Int. Cl.
*G06F 12/00* (2006.01)
*G06F 11/14* (2006.01)
*G06F 9/50* (2006.01)
*G06F 9/455* (2018.01)
*G06F 3/06* (2006.01)

(52) U.S. Cl.
CPC .......... *G06F 11/1461* (2013.01); *G06F 3/065* (2013.01); *G06F 3/0647* (2013.01); *G06F 9/45558* (2013.01); *G06F 9/5077* (2013.01); *G06F 11/1448* (2013.01); *G06F 2009/45562* (2013.01)

(58) Field of Classification Search
CPC ............ G06F 11/1461; G06F 11/1448; G06F 9/45558; G06F 9/5077; G06F 2009/45562; G06F 3/0647; G06F 3/065
See application file for complete search history.

(56) References Cited

U.S. PATENT DOCUMENTS

| 9,720,783 | B1* | 8/2017 | Kulkarni | G06F 11/1461 |
| 2019/0065508 | A1* | 2/2019 | Guturi | G06F 16/2246 |

* cited by examiner

*Primary Examiner* — Shawn X Gu
(74) *Attorney, Agent, or Firm* — Womble Bond Dickinson (US) LLP

(57) ABSTRACT

One embodiment is related to a method for backing up virtual machines, comprising: determining whether virtual machines comprised in a backup policy group are to be backed up based on a present time and a backup schedule associated with the backup policy group; in response to a determination that the virtual machines comprised in the backup policy group are to be backed up, determining a data change ratio since a previous backup for each virtual machine comprised in the backup policy group; and backing up each virtual machine comprised in the backup policy group that has a data change ratio since the previous backup that meets a data change threshold associated with the backup policy group.

15 Claims, 4 Drawing Sheets

EFFECTIVE DATA CHANGE BASED RULE TO ENABLE BACKUP FOR SPECIFIC VMWARE VIRTUAL MACHINE

FIELD OF THE INVENTION

Embodiments of the disclosure are related to electronic devices, and more particularly, to a method, apparatus, and system for backing up virtual machines in a virtual environment.

BACKGROUND

With a conventional approach to backing up virtual machines, and based on a schedule specified in backup policies, a set of virtual machines are backed up in a scheduled backup run irrespective of the amount of data change since the previous backup. This creates irregular incremental backup images where some of the backup points have little new data while other backup points have a significant amount of new data in the backup images.

The time schedule based conventional approach has several drawbacks. For example, periodic full backups are scheduled that are spaced by a certain number of incremental backups irrespective of the amount of data change since the previous full backup. This may result in inefficient use of backup storage space. Further, because incremental backups are scheduled at fixed intervals, an incremental backup can potentially contain a large amount of new data. If such an incremental backup image is lost or corrupted, a significant data loss may result. In another scenario, if a reversion to a state before the incremental backup with a large amount of new data was performed is desired, the reversion operation may take a significant amount of time to complete due to the size of the incremental backup.

Furthermore, backups based on a fixed schedule may cause performance degradation. For example, when a large number of virtual machines are scheduled to be backed up in a same backup run, there may be not enough system resources left for applications running at the time of the backup run, and the application performance may suffer as a result.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the disclosure are related to a method, apparatus, and system for backing up virtual machines. The operations may comprise: determining whether virtual machines comprised in a backup policy group are to be backed up based on a present time and a backup schedule associated with the backup policy group; in response to a determination that the virtual machines comprised in the backup policy group are to be backed up, determining a data change ratio since a previous backup for each virtual machine comprised in the backup policy group; and backing up each virtual machine comprised in the backup policy group that has a data change ratio since the previous backup that meets a data change threshold associated with the backup policy group.

Figure 1:
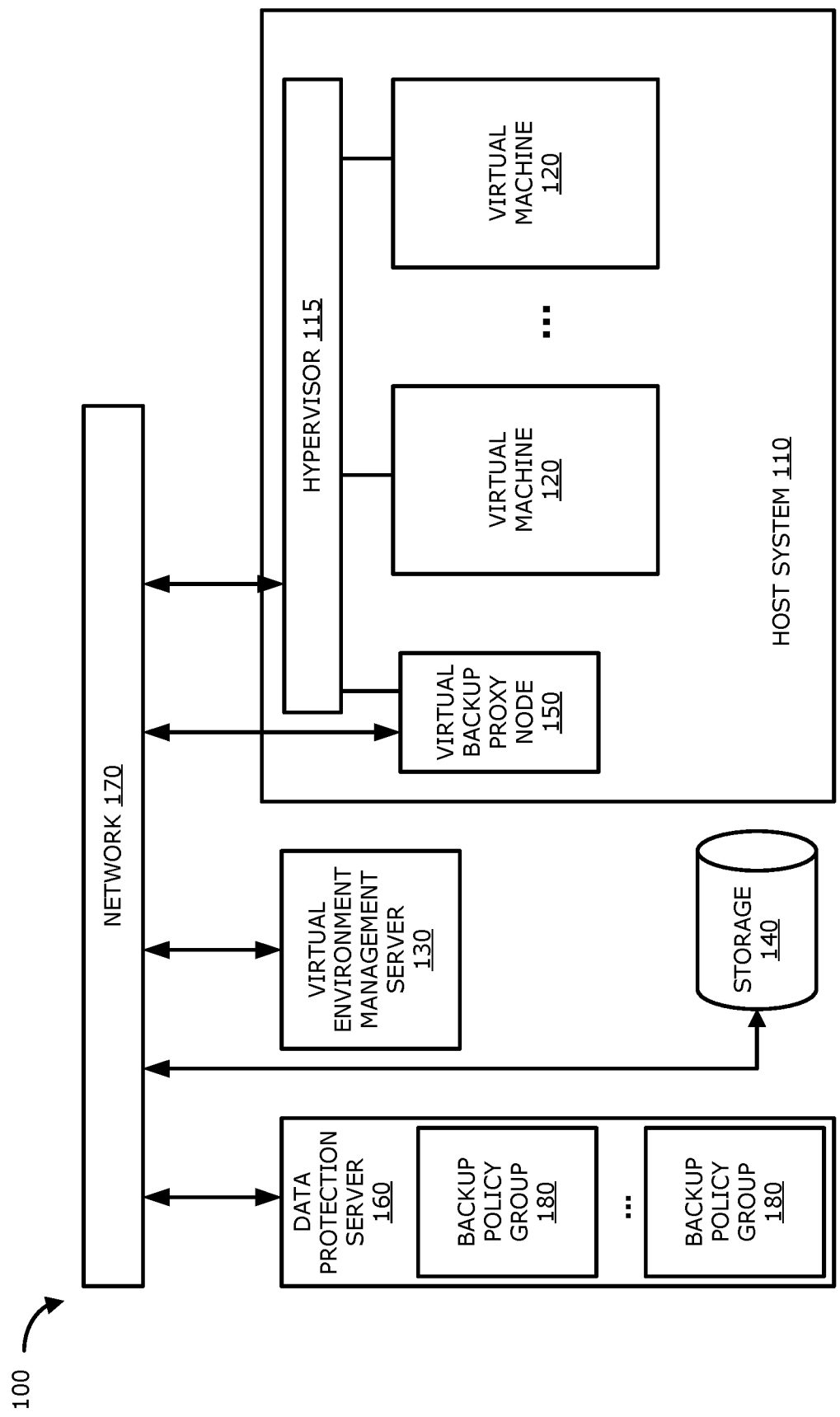
FIG. 1 is a block diagram illustrating an example environment in which embodiments of the disclosure may be practiced.

Referring to FIG. 1, a block diagram illustrating an example environment 100 in which embodiments of the disclosure may be practiced is shown. A hardware host system 110 may host one or more virtual machines 120 with the assistance of a hypervisor (e.g., VMware ESXi) 115. The hypervisor 115 may be managed by a virtual environment management server (e.g., VMware vCenter) 130.

The host system 110 may further host a virtual backup proxy node 150. The virtual backup proxy node 150 may, under the coordination of the virtual environment management server 130 and a data protection server 160, back up disk images of the virtual machines 120 to the storage device 140. The virtual backup proxy node 150 may also perform recovery operations by restoring the backed up disk images from the storage device 140 to the host system 110 for access by virtual machines 120. It should be appreciated that the hypervisor 115, virtual backup proxy node 150, virtual environment management server 130, data protection server 160, and the storage device 140 may have access to a common network 170 (e.g., a public network), through which they may communicate with each other. Therefore, under the coordination of the virtual environment management server 130 and the data protection server 160, the virtual backup proxy node 150 may back up the disk images of the virtual machines 120 by copying the disk images to the storage device 140 through the network 170.

The virtual machines 120 may be assigned to one or more backup policy groups 180. Each policy group 180 may comprise one or more of the virtual machines 120, and may be associated with a backup schedule, which may be periodical (e.g., once every hour at a particular time, once every day at a particular time, etc.). Each policy group 180 may further comprise a data change threshold (e.g., 3%, 5%, etc.). Thus, the disk images of the virtual machines 120 may be backed up based on the backup schedule and/or the data change threshold contained in the respective backup policy groups 180.

Figure 2:
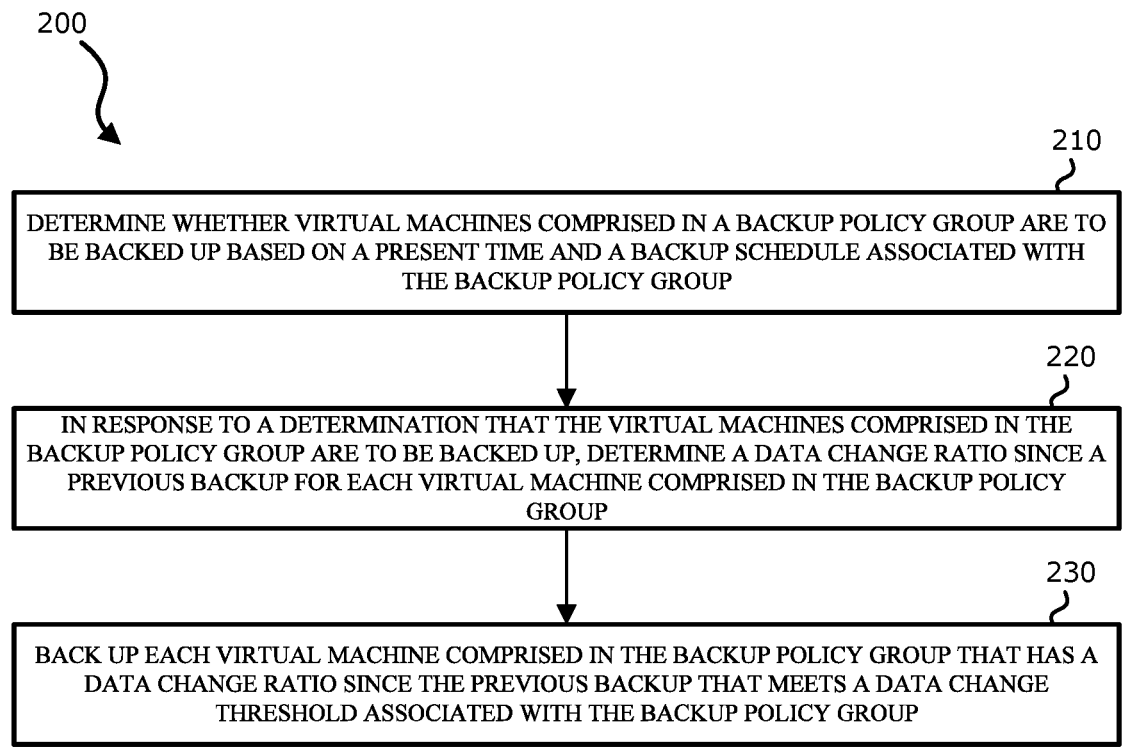
FIG. 2 is a flowchart illustrating an example method for backing up virtual machines, according to one embodiment of the disclosure.

Referring to FIG. 2, a flowchart illustrating an example method 200 for backing up virtual machines, according to one embodiment of the disclosure, is shown. At block 210, whether virtual machines comprised in a backup policy group are to be backed up may be determined based on a present time and a backup schedule associated with the backup policy group. At block 220, in response to a determination that the virtual machines comprised in the backup policy group are to be backed up, a data change ratio since a previous backup may be determined for each virtual machine comprised in the backup policy group. At block 230, each virtual machine comprised in the backup policy group that has a data change ratio since the previous backup that meets a data change threshold associated with the backup policy group may be backed up (e.g., the disk image of the virtual machine is copied to a backup storage device). The backup may be an incremental backup (i.e., only new or altered data are included in the backup). Virtual machines that have data change ratios that do not meet the data change threshold may be skipped in the present scheduled backup run.

For example, if a backup policy group is associated with a data change threshold of 3% and comprises three virtual machines that have data change ratios of 10%, 1%, and 0%, respectively, at the time of a scheduled backup run, only the virtual machine that has a data change ratio of 10% (which is greater than the data change threshold of 3%) is backed up in the present backup run. The other two virtual machines are skipped in this backup run. It should be noted that the virtual machine with the data change ratio of 0% may have been powered off since the previous backup, and no backup is required for this virtual machine at this time.

In one embodiment, a data change ratio meets the data change threshold when the data change ratio is equal to or greater than the data change threshold. In another embodiment, a data change ratio meets the data change threshold only when the data change ratio is greater than the data change threshold.

In another embodiment, in addition to a backup schedule and a data change threshold, a backup policy group may be further associated with an automatic initiation ("auto_initiation") flag. When the flag is set, under the coordination of the virtual environment management server 130, a (lightweight) agent may be installed on each virtual machine comprised in the backup policy group to determine the data change ratio at the virtual machine, either in real time or periodically with short intervals. When the data change ratio at the virtual machine reaches the data change threshold associated with the backup policy group, a backup of the virtual machine may be triggered immediately, even if the time of the next scheduled backup run has not arrived. Thus, when the time for the scheduled backup run arrives, no or very few virtual machines in the backup policy group need to be backed up because most likely the data change ratios since the previous backup for the virtual machines comprised in the backup policy group do not meet the data change threshold. In other words, virtual machines comprised in the backup policy group are almost always protected through backups when the data change ratio reaches the data change threshold, and the incremental backups mostly correspond to the same data change ratio, which is the data change threshold associated with the backup policy group.

Figure 3:
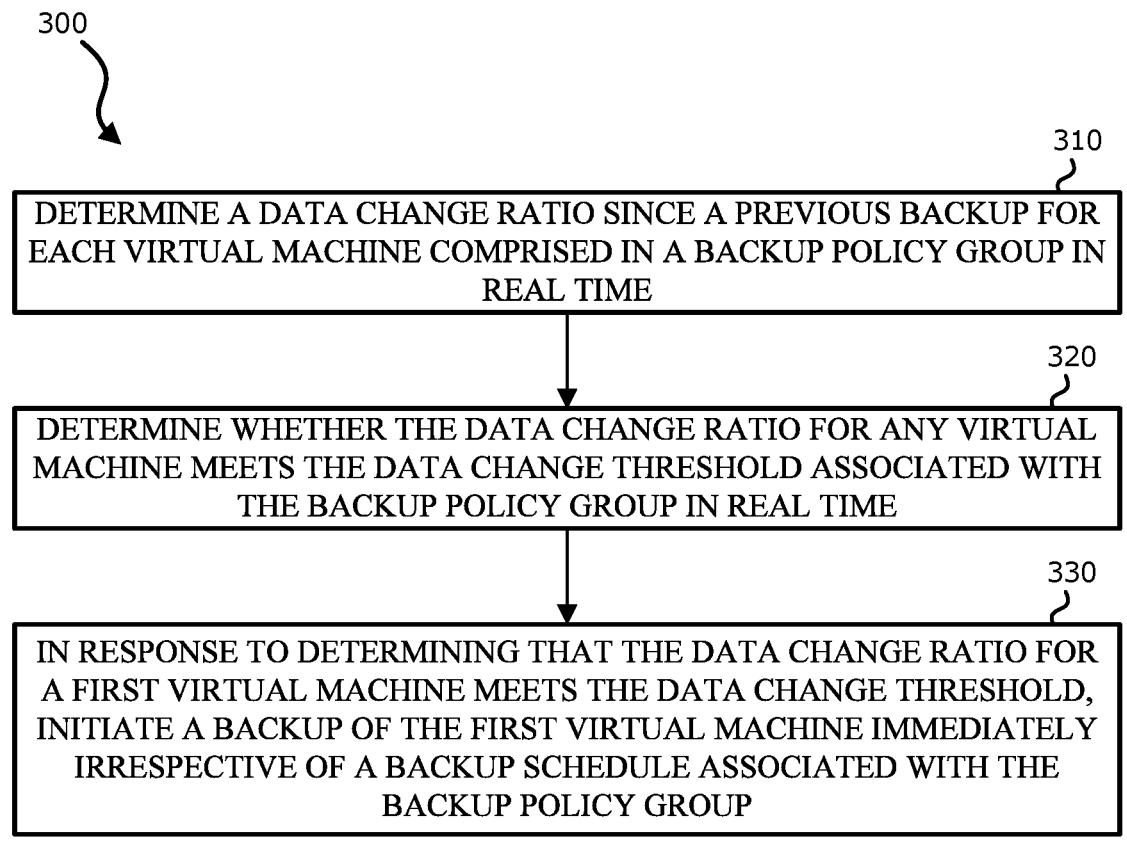
FIG. 3 is a flowchart illustrating an example method for backing up virtual machines, according to another embodiment of the disclosure.

Referring to FIG. 3, a flowchart illustrating an example method 300 for backing up virtual machines, according to another embodiment of the disclosure, is shown. At block 310, a data change ratio since a previous backup may be determined for each virtual machine comprised in a backup policy group in real time. At block 320, whether the data change ratio for any virtual machine meets the data change threshold associated with the backup policy group may be determined in real time. At block 330, in response to determining that the data change ratio for a first virtual machine meets the data change threshold, a backup of the first virtual machine may be initiated immediately irrespective of a backup schedule associated with the backup policy group. The backup may be an incremental backup.

In yet another embodiment, a backup policy group may further be associated with a full backup flag and a full backup threshold. When the flag is set, a full backup (i.e., a backup of all data including both unchanged data and new or altered data) may be performed after the number of consecutive already-performed incremental backups meets the full backup threshold. For example, if the full backup threshold is 5, a full backup will be performed at the next backup run after 5 consecutive incremental backups.

Methods 200 and 300 may be performed by processing logic that includes hardware (e.g. circuitry, dedicated logic, etc.), software (e.g., embodied on a non-transitory computer readable medium), or a combination thereof. For example, methods 200 and 300 may be performed by processors 1501 of FIG. 4. Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Therefore, embodiments of the disclosure are related to coordinating the backup of virtual machines based on data change ratios since a previous backup and a data change threshold associated with the backup policy group. Accordingly, customers can be certain that the backup environment is performing backups that comprise suitable amounts of new data. Both unnecessary backups and backups that contain too much new data at once can be avoided. By eliminating unnecessary backups, as well as staggering the backups within the same backup policy group in some embodiments, system resources usage can be reduced; consequently, more system resources may become available for other parallel operations, such as the execution of production applications. Furthermore, the metadata size and index size may also be reduced.

Figure 4:
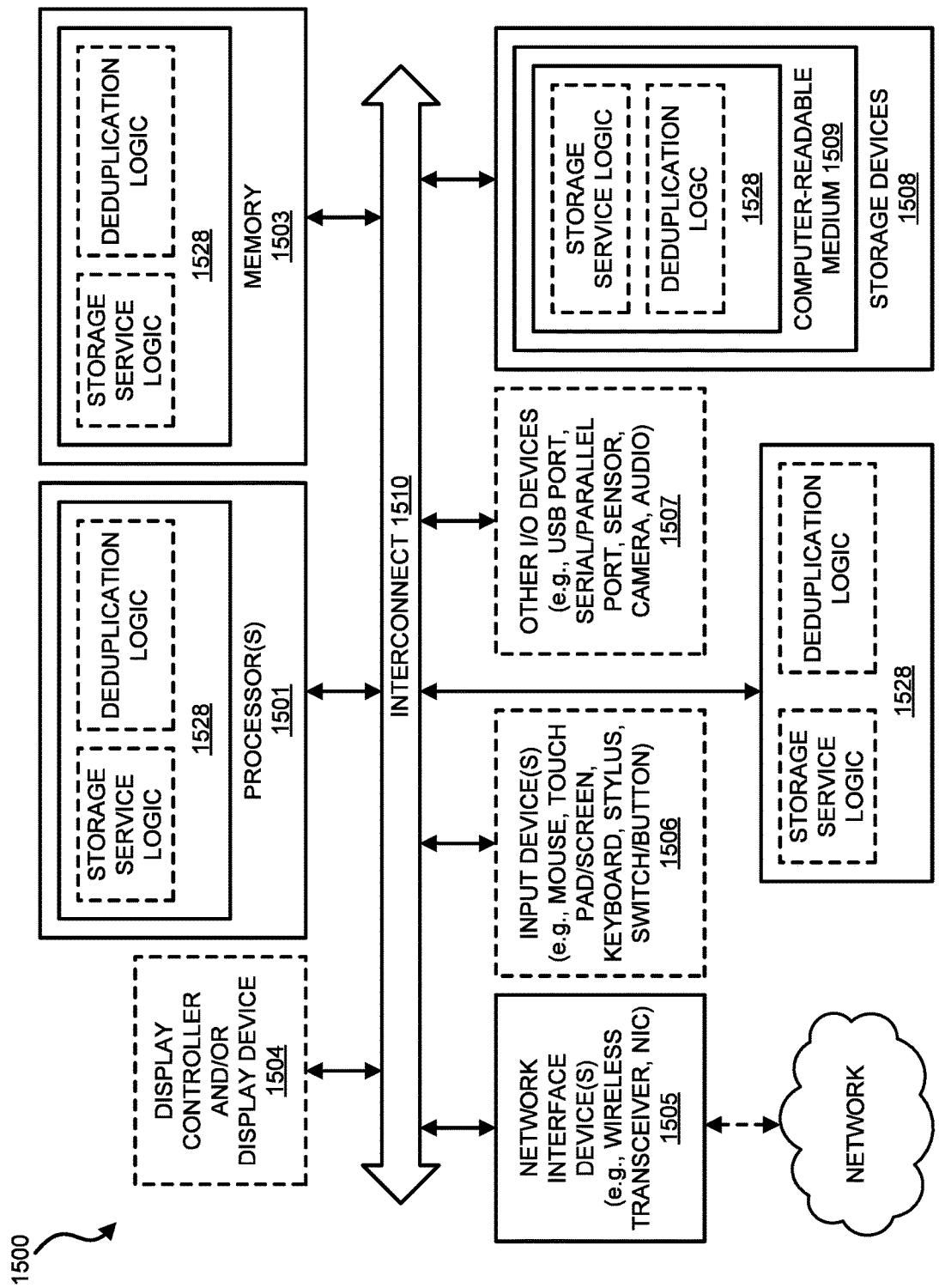
FIG. 4 is a block diagram illustrating an example of a data processing system which may be used with one embodiment of the disclosure.

FIG. 4 is a block diagram illustrating an example of a data processing system 1500 which may be used with one embodiment of the disclosure. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for backing up virtual machines, comprising:
   determining whether virtual machines comprised in a backup policy group are to be backed up based on a present time and a backup schedule associated with the backup policy group;
   in response to a determination that the virtual machines comprised in the backup policy group are to be backed up, determining a data change ratio since a previous backup for each virtual machine comprised in the backup policy group;
   backing up each virtual machine comprised in the backup policy group that has a data change ratio since the previous backup that meets a data change threshold associated with the backup policy group;
   skipping backup of virtual machines comprised in the backup policy group that have data change ratios that do not meet the data change threshold;
   determining whether an automatic initiation flag associated with the backup policy group is set; and
   in response to determining that the automatic initiation flag associated with the backup policy group is set;
   a) determining the data change ratio since the previous backup for each virtual machine comprised in the backup policy group in real time;
   b) determining whether the data change ratio for any virtual machine comprised in the backup policy group meets the data change threshold associated with the backup policy group in real time; and
   c) in response to determining that the data change ratio for a first virtual machine comprised in the backup policy group meets the data change threshold, initiating a backup of the first virtual machine immediately irrespective of the backup schedule associated with the backup policy group.

2. The method of claim 1, wherein the data change ratio since the previous backup is determined in real time with an agent installed on each virtual machine comprised in the backup policy group.

3. The method of claim 1, wherein backing up the first virtual machine comprises performing an incremental backup.

4. The method of claim 1, wherein a full backup is performed for the first virtual machine after a predetermined number of consecutive incremental backups have been performed for the first virtual machine.

5. The method of claim 1, wherein backing up of the first virtual machine is performed through a virtual backup proxy node and is coordinated by a virtual environment management server and a data protection server.

6. A non-transitory machine-readable medium having instructions stored therein which, when executed by a processor, cause the processor to perform backup operations, the operations comprising:
- determining, whether virtual machines comprised in a backup policy group are to be backed up based on a present time and a backup schedule associated with the backup policy group;
- in response to a determination that the virtual machines comprised in the backup policy group are to be backed up, determining a data change ratio since a previous backup for each virtual machine comprised in the backup policy group;
- backing up each virtual machine comprised in the backup policy group that has a data change ratio since the previous backup that meets a data change threshold associated with the backup policy group;
- skipping backup of virtual machines comprised in the backup policy group that have data change ratios that do not meet the data change threshold;
- determining whether an automatic initiation flag associated with the backup policy group is set; and
- in response to determining that the automatic initiation flag associated with the backup policy group is set;
  - a) determining the data change ratio since the previous backup for each virtual machine comprised in the backup policy group in real time;
  - b) determining whether the data change ratio for any virtual machine comprised in the backup policy group meets the data change threshold associated with the backup policy group in real time; and
  - c) in response to determining that the data change ratio for a first virtual machine comprised in the backup policy group meets the data change threshold, initiating a backup of the first virtual machine immediately irrespective of the backup schedule associated with the backup policy group.

7. The non-transitory machine-readable medium of claim 6, wherein the data change ratio since the previous backup is determined in real time with an agent installed on each virtual machine comprised in the backup policy group.

8. The non-transitory machine-readable medium of claim 6, wherein backing up the first virtual machine comprises performing an incremental backup.

9. The non-transitory machine-readable medium of claim 6, wherein a full backup is performed for the first virtual machine after a predetermined number of consecutive incremental backups have been performed for the first virtual machine.

10. The non-transitory machine-readable medium of claim 6, wherein backing up of the first virtual machine is performed through a virtual backup proxy node and is coordinated by a virtual environment management server and a data protection server.

11. A data processing system, comprising:
- a processor; and
- a memory coupled to the processor storing instructions which, when executed by the processor, cause the processor to perform backup operations, the operations including:
  - determining whether virtual machines comprised in a backup policy group are to be backed up based on a present time and a backup schedule associated with the backup policy group;
  - in response to a determination that the virtual machines comprised in the backup policy group are to be backed up, determining a data change ratio since a previous backup for each virtual machine comprised in the backup policy group;
  - backing up each virtual machine comprised in the backup policy group that has a data change ratio since the previous backup that meets a data change threshold associated with the backup policy group;
  - skipping backup of virtual machines comprised in the backup policy group that have data change ratios that do not meet the data change threshold;
  - determining whether an automatic initiation flag associated with the backup policy group is set; and
  - in response to determining that the automatic initiation flag associated with the backup policy group is set;
    - a) determining the data change ratio since the previous backup for each virtual machine comprised in the backup policy group in real time;
    - b) determining whether the data change ratio for any virtual machine comprised in the backup policy group meets the data change threshold associated with the backup policy group in real time; and
    - c) in response to determining that the data change ratio for a first virtual machine comprised in the backup policy group meets the data change threshold, initiating a backup of the first virtual machine immediately irrespective of the backup schedule associated with the backup policy group.

12. The data processing system of claim 11, wherein the data change ratio since the previous backup is determined in real time with an agent installed on each virtual machine comprised in the backup policy group.

13. The data processing system of claim 11, wherein backing up the first virtual machine comprises performing an incremental backup.

14. The data processing system of claim 11, wherein a full backup is performed for the first virtual machine after a predetermined number of consecutive incremental backups have been performed for the first virtual machine.

15. The data processing system of claim 11, wherein backing up of the first virtual machine is performed through a virtual backup proxy node and is coordinated by a virtual environment management server and a data protection server.

* * * * *